F. BROWN.
AUTOMATIC COMPRESSION OILER FOR INTERNAL COMBUSTION ENGINES.
APPLICATION FILED JULY 16, 1915.
1,177,228.  Patented Mar. 28, 1916.
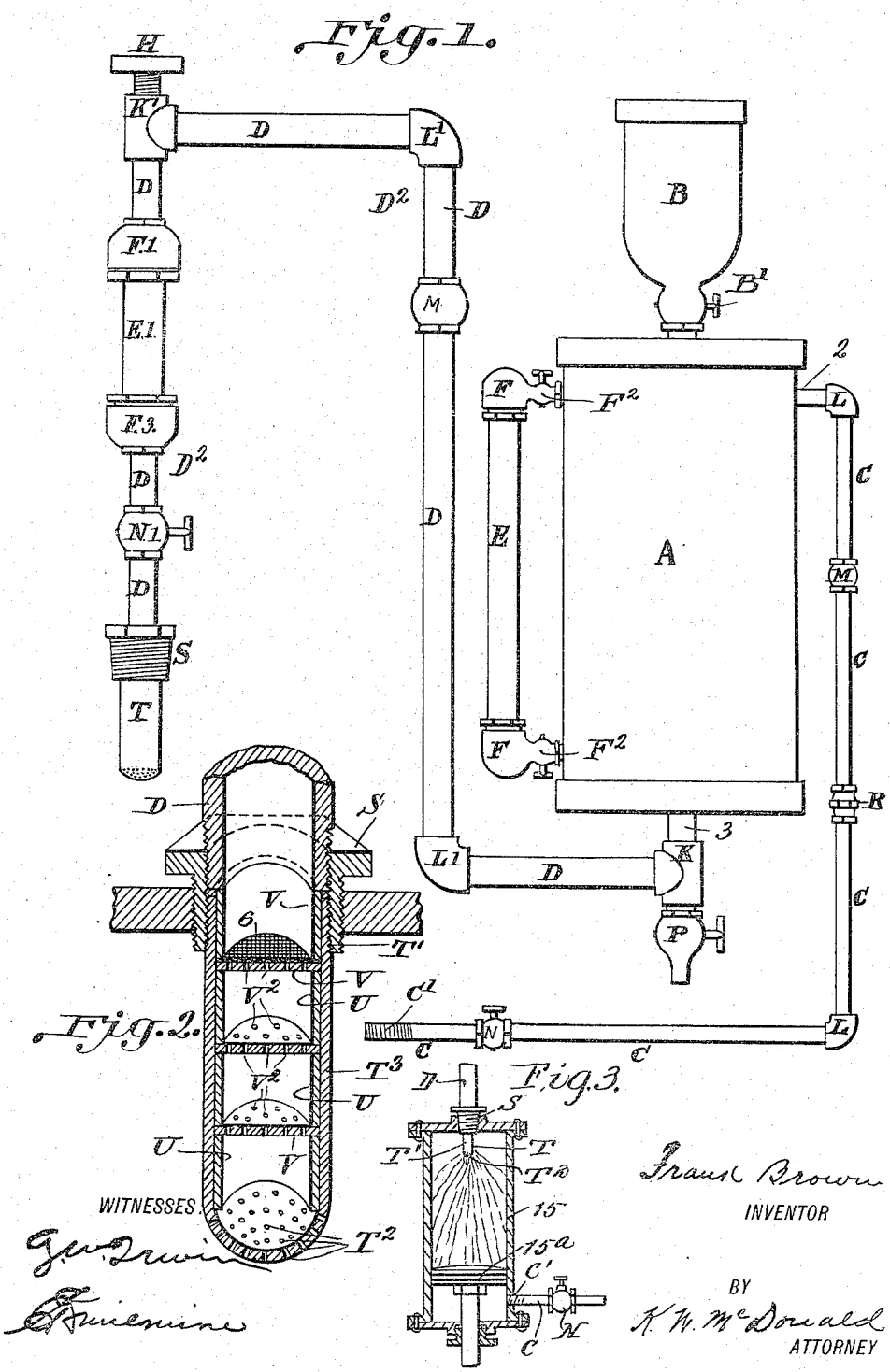

UNITED STATES PATENT OFFICE.

FRANK BROWN, OF BRIDGEPORT, NEBRASKA.

AUTOMATIC COMPRESSION-OILER FOR INTERNAL-COMBUSTION ENGINES.

1,177,228.  Specification of Letters Patent.  Patented Mar. 28, 1916.

Application filed July 16, 1915. Serial No. 40,275.

*To all whom it may concern:*

Be it known that I, FRANK BROWN, a citizen of the United States, residing at Bridgeport, Morrill county, State of Nebraska, have invented a new and useful Automatic Compression-Oiler for Internal-Combustion Engines, of which the following is a specification.

This invention relates to the art of lubrication and more especially to an improved automatic compression lubricator or oiler for internal combustion engines, and an object of the invention is to provide a sprayer connected to one end of the engine cylinder, in combination with an oil reservoir having connections with the sprayer, and being so connected with the cylinder of the engine, that upon the return from the compression stroke of the piston, pressure is created in the reservoir, to force oil or lubricant to the sprayer, which discharges a spray of oil or lubricant upon the piston during its entire travel, thereby insuring perfect lubrication between the piston and the engine cylinder.

In practical fields the details of construction may necessitate alterations, falling within the scope of what is claimed.

The invention comprises further features and combination of parts, as hereinafter set forth, shown in the drawings and claimed.

In the drawings: Figure 1 is a view in elevation of the improved compression lubricating system. Fig. 2 is a sectional perspective view of the sprayer. Fig. 3 is a sectional view, showing the sprayer and the threaded ends of the pipe *c* connected to an engine cylinder.

Referring more especially to the drawings, A designates a conventional form of oil reservoir, which may be any form and size, just so long as it is capable of withstanding an internal pressure of fifty pounds to the square inch substantially, and which reservoir is provided with a conventional form of screw top oil cup B having a stop cock B', whereby the reservoir may be filled while the conventional engine 15 is in service. Threaded into the side of the reservoir near the top and the bottom thereof are glass unions F having stop cocks $F^2$. The glass unions F are connected by the glass tubular member E. The top portion as at 2 of the reservoir is provided with a connection to the combustion chamber of the engine, in such manner as to create substantially fifty pounds of pressure to the square inch in the reservoir above the upper surface of the oil or lubricant therein. This connection consists of the pipe sections C, C, C, C, and C, most of which are connected by the elbow joints L L and the pipe union R. However, connecting two of the pipe sections C C is the usual form of check valve M, the interior of which is not shown. However, the check valve M constitutes means to prevent the back flow of the pressure designed to be created in the reservoir above the surface of the oil. Connecting two of the other pipe sections C C is a stop cock N, to cut off the effect of the compression in the combustion chamber of the engine 15. In other words, this stop cock N prevents the creation of the pressure in the reservoir. The aforesaid connections are designed to be connected to the cylinder of the engine 15, as indicated at C'. Extending from the lower end of the reservoir is a short section of pipe 3, to which the T K is connected, and connected to the lower end of this T K is a stop cock P, for draining the oil from the reservoir, as well as the sediment therein. Designed to be connected to the engine cylinder at the proper end, in order to discharge a spray of oil upon one face of the engine piston $15^a$ and upon the inner circumference of the cylinder, in order to thoroughly lubricate the piston during its entire travel is a tubular sprayer T. In fact the sprayer T is first threaded in a slight tapering nut S, which is threaded into the wall of the cylinder of the engine 15, and connecting the nut S and the T K is a connection $D^2$, which consists mainly of the pipe sections D, D, D, D, D, D, and D. The first four of the pipe sections D D, that is leading from the T K, are connected by the elbow joints L' L', and the check valve $M^2$, the interior of which is not shown. This check valve $M^2$ is designed mainly to prevent the back flow of the oil or lubricant, after it is forced to the sprayer under pressure.

Two of the pipe sections D D are connected by the T K', and threaded into the T K' is a temper screw or needle valve H, designed to coöperate with its seat, in order to control the flow of oil or lubricant under pressure into the engine. The pipe section D just below the T K' is connected to a glass union F', which in turn is connected to the glass tube E', and to which tube E' a second glass union $F^3$ is connected. The glass unions F' and $F^3$ and the tube E' constitutes means whereby the amount of oil or lubricant passing to the sprayer may be disclosed. Connecting the two pipe sections D D below the glass union $F^3$ is a stop cock N', which may be manipulated to cut off the supply of lubricant or oil to the sprayer. The sprayer P consists of a tubular casing T', the lower end of which is globular in contour, and is provided with perforations $P^2$, and owing to the globular shape of the lower end of said casing T', the lubricant or oil will not only spray on one face of the piston $15^a$ of the engine 15, but will spray upon the circumferential walls of the engine cylinder. The upper portion of the casing $T^3$ is exteriorly threaded as at T', so as to thread into the nut S, which is designed to thread, as shown into the wall of the engine. Arranged in the tubular casing T' is a plurality of tubular sections U U, and interposed between these tubular sections are disks V V, which are provided with perforations $V^2$. Interposed between the upper face of the uppermost disk and the lower edge of the uppermost tubular section U is a fine mesh of cloth gauze 6. It is to be noted that the pipe section D which screws into the nut S has its lower end bearing against the upper edge of the uppermost tubular section U, thereby holding the plurality of tubular sections and disks clamped together. It will be observed that by the provision of the perforated disks and the fine mesh of cloth gauze, the lubricant or oil, as it is forced under pressure into the sprayer is thoroughly broken into small parts by the time it reaches the perforated globular end of the casing T', and as the oil passes through the perforated globular end it is further broken into small particles, and is sprayed upon the piston $15^a$, as well as upon the interior circumferential walls of the engine cylinder, thereby insuring perfect lubrication between the piston and the interior wall of the cylinder. The glass tubular section E and the glass unions F constitute a conventional form of oil gage, in order to disclose the amount of lubricant in the reservoir A. As the piston $15^a$ of the engine 15 makes a return from its compression stroke, pressure substantially fifty pounds to the square inch is created in the reservoir above the surface of the lubricant or oil, through the medium of the connections C C, thereby forcing the lubricant or oil through the connections $D^2$, to and through the sprayer, so as to be sprayed into fine particles upon the piston and the interior of the engine. The stop cock P constitutes means to also drain the connections D D.

The invention having been set forth, what is claimed as new and useful is:—

In combination, a combustion engine cylinder, an oil reservoir having connections with the cylinder, whereby as the piston of the engine is making the return from its compression stroke pressure is created in the reservoir above the surface of the lubricant, a sprayer designed to be connected to the cylinder to spray lubricant upon the piston and the interior surface of the cylinder, and a connection between the sprayer and the lower part of the reservoir below the lubricant, whereby as pressure is created above the oil or lubricant, the lubricant is forced to and through the sprayer into the cylinder, said sprayer having means consisting of a plurality of perforated disks clamped therein and superimposed and including a fine mesh of gauze, for breaking the lubricant into small particles.

FRANK BROWN.

Witnesses:
R. A. RIDDLE,
R. H. McCROSSON.

Copies of this patent may be obtained for five cents each, by addressing the "Commissioner of Patents, Washington, D. C."